United States Patent [19]

Carmichael et al.

[11] 3,994,517
[45] Nov. 30, 1976

[54] PIPE ANCHOR FOR WELLHEAD ASSEMBLIES

[75] Inventors: James T. Carmichael; Joe G. Chambless; John P. Honaker, Jr., all of Shreveport, LA

[73] Assignee: W-K-M Wellhead Systems, Inc., Shreveport, La.

[22] Filed: Oct. 1, 1975

[21] Appl. No.: 618,648

[52] U.S. Cl. .................................. 285/146; 285/147
[51] Int. Cl.² ......................................... F16L 21/00
[58] Field of Search ........... 285/144, 145, 146, 147, 285/148, 133 R; 24/263 D, 263 DL, 263 DS, 263 DT

[56] References Cited
UNITED STATES PATENTS

| | | | |
|---|---|---|---|
| 2,624,413 | 1/1953 | Mueller et al. | 285/147 |
| 3,011,806 | 12/1961 | Allen et al. | 285/147 |
| 3,096,554 | 7/1963 | Johnson | 285/147 X |
| 3,334,923 | 8/1967 | Putch | 285/147 X |

*Primary Examiner*—Dave W. Arola
*Attorney, Agent, or Firm*—Eugene N. Riddle

[57] ABSTRACT

A pipe anchoring device including an annular segmented support mounted in the bowl of a wellhead assembly. Each of the segments has a generally cylindrically shaped front face with a plurality of upwardly extending teeth thereon to engage a pipe, and a frusto-conically shaped back face with a smooth surface load bearing lower portion and a plurality of sharp downwardly extending teeth adjacent the load bearing smooth lower portion with the teeth extending to the conical plane defined by the surface forming the lower portion. The outer smooth surface portion of the back face is in slidable load bearing contact with the adjacent support structure under initial loading as teeth on the front face engage the pipe, and under higher loading conditions the teeth on the back face bite into the adjacent support structure. One embodiment of the segments has a load bearing smooth upper portion on its back face adjacent the teeth and in slidable contact with the support structure.

25 Claims, 13 Drawing Figures

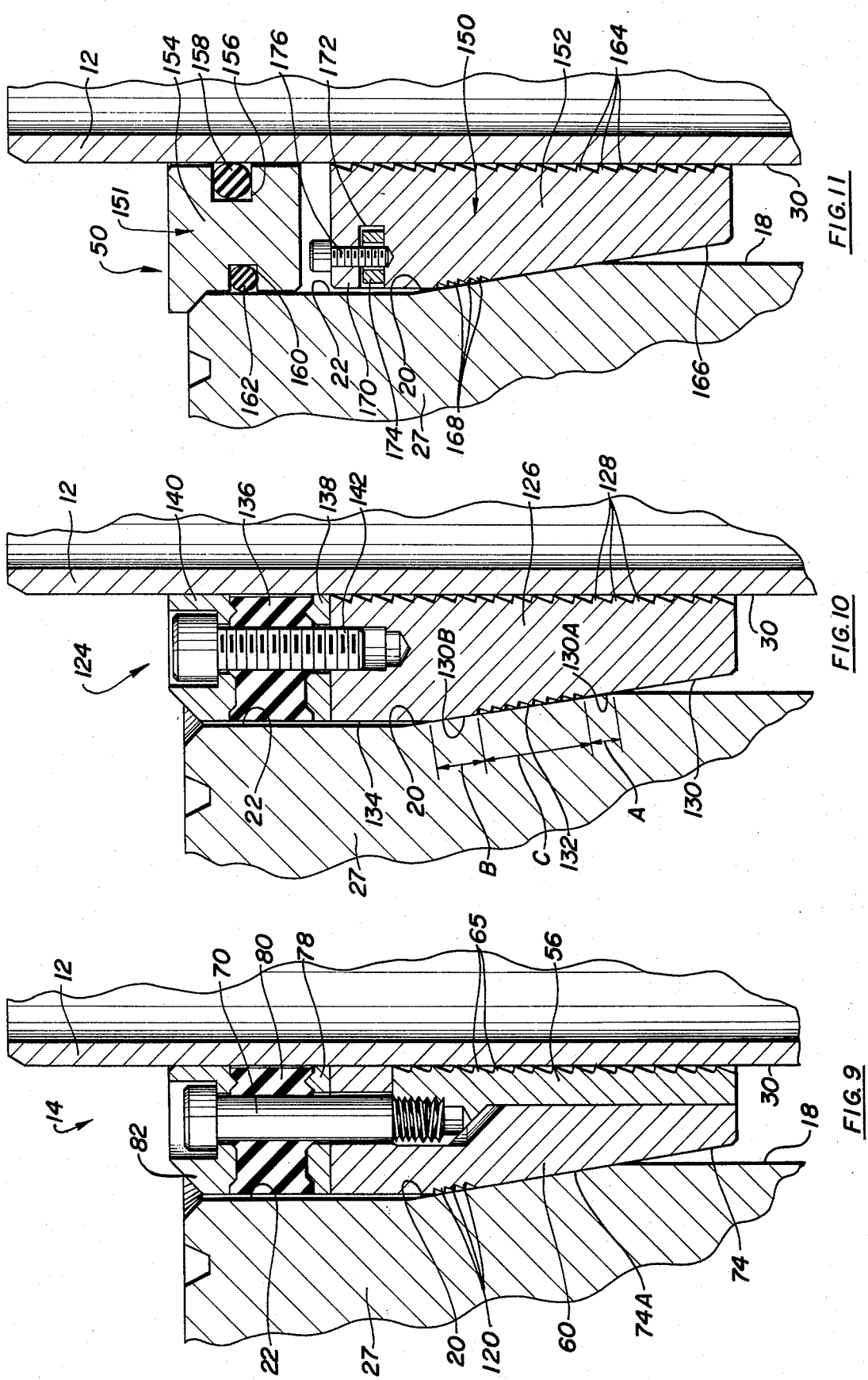

PIPE ANCHOR FOR WELLHEAD ASSEMBLIES

BACKGROUND OF THE INVENTION

This invention is related to pipe anchoring devices used in wellheads. More specifically, the invention pertains to anchoring devices utilizing slips for engaging a pipe and transferring the load to the casing head of a wellhead assembly.

A slip as referred to in the discussion herein is a wedge-like member having a somewhat cylindrical inner portion or front face and a tapered outer portion of back face. In use a pipe sometimes referred to as casing hereinafter is positioned through the slip on the front face and the back face is mounted in the bowl of the casing head portion of a wellhead assembly. The use of slips is well-known in the art, particularly in that segment related to oilfield wellhead assembly. Generally, all slips function somewhat the same in that the front face grasps the pipe and the back face grasps and engages the wellhead assembly as the pipe moves downwardly to a point where the weight of the pipe is supported or suspended by the slips. A difficulty experienced with the use of slips for the suspension of well casing is that the weight of the casing, particularly in deep wells, tends to place such large forces on the slips that the casing is collapsed or substantially radially compressed to a reduced diameter in the area where it contacts the slips. Generally, slips are designed so the final radial pressure exterted by the slip on the pipe or casing is such that the casing is not reduced in diameter to an extent which would prevent full gauge tools from passing through the casing in the area of the slips. Also they are designed such that stresses in the casing in the area of the slips are below the yield point.

In the prior art of slips used for the suspension of casing in a wellhead assembly, numerous designs are known which are operable to suspend casing in a wellhead assembly. However, the designs have certain drawbacks which are overcome by the pipe anchor of this invention. One of these prior art designs incorporates successive steps on the slip back face to provide a slip with a long travel and short effective length which will spread out the loads on the slip.

This construction is satisfactory but it is extremely expensive because of the precise tolerances required to effect simultaneous operation of the slips so they will seat simultaneously. Furthermore, another problem associated with this device is that the short effective length of the slip will cause the pipe or casing to be easily collapsed. Another known prior art device is constructed to increase the coefficient or friction between the backs of the slips and the surface of the bowl in the casing head. This is done by rough machining the surface in the bowl. Although this device will work it has not proven to be desirable because it does not provide sufficient gripping to firmly hold the pipe and prevent it from moving. Other pipe hangers are known which utilize a casing head bowl that is not tapered. This is accomplished by providing a tapered insert as a part of the slip. While this device can be made operable it has an inherent disadvantage in that it requires a considerable amount of high tolerance machining in the casing head bowl and on the segments of the slips for it to operate dependably and the cost of such machining can be prohibitive. Some slip constructions are known which are constructed to gall or tear the interior surface of the casing head bowl as they are loaded by utilizing teeth, protuberances, or other galling members on the back face of the slip segments. All these devices can be made operable; however, they require fine control of the materials from which the casing head and the slips are constructed so the coefficient of friction can be closely controlled as well as the motion of the slips both inwardly and downwardly.

SUMMARY OF THE INVENTION

In a structural embodiment of the pipe anchor of this invention, the annular segmented slip or support has a plurality of upwardly extending teeth on its cylindrically shaped front face, a generally frustoconically shaped downwardly and inwardly tapering back face having a load bearing smooth surface on its lower portion with a plurality of downwardly extending sharp teeth adjacent the lower smooth surface projecting to the conical plane defined by the smooth lower surface. The pipe anchor of this invention is constructed to suspend well casing with the segmented pipe anchor structure being mounted in a wellhead assembly having a central opening defined by a smooth frustconical surface.

The slips or pipe supports are designed so that the upwardly extending teeth on the front face bite into the pipe during initial loading when the smooth frustoconical surface of the back face is in sliding contact with the frustoconical smooth surface of the wellhead assembly. When a predetermined loading is reached from the weight of the pipe, such as around 30,000 pounds for example, the downwardly extending teeth on the back face bite into the smooth surface to increase friction between the slip and the casing head. In the final loaded condition the pipe anchor prevents downward relative movement of the casing in the wellhead assembly and supports the casing.

Another embodiment of the pipe anchor of this invention includes a segmented slip having load bearing upper and lower smooth surface portions on its back face with sharp teeth between the smooth surface portions. The upper smooth surface load bearing portion aids in controlling accurately the penetration of the teeth under specified loading conditions.

A further embodiment of the present pipe anchor includes means to seal the annular space between the casing and the inner surface of the casing head as loading increases on the slips so that in the final installed condition the annular space is sealed. The slips include an inner portion mounted for initial movement with the casing relative to an outer portion. An upper compression ring is mounted over a resilient seal and is operatively connected to the inner portion for initial downward movement with the ring to expand the seal outwardly for sealing between the casing and casing head. A stop between the inner and outer portions of the slips limits the relative movement between the portions and thus the compression of the seal.

In yet another embodiment the pipe anchor of this invention includes a means to seal the annular space between the casing and the bowl surface in the casing head which is manually actuatable. This means to seal has a resilient seal ring above the segments forming the slips, a compression ring above the seal ring, and a plurality of bolts extending through the compression ring and seal ring into the segments. Tightening the bolts manually compresses the seal ring vertically and expands it into sealing relation between the casing head bowl and the casing.

One object of this invention is to provide a pipe anchor for use in mounting and suspending well casing in a wellhead assembly including a slip mountable in a frustoconically shaped bowl of a casing head.

Still another object of this invention is to provide a pipe or casing anchor which has a lower smooth surface portion on its exterior that moves in sliding contact with a smooth surface portion of a frustoconically shaped casing head bowl during initial loading and which has a plurality of downwardly extending sharp teeth or the like immediately adjacent the lower smooth surface portion that bite into the frustoconically shaped casing head bowl after a predetermined higher loading.

Yet another object of this invention is to provide a pipe anchor or slip for a wellhead which has a seal structure included therewith to seal the annular space between the casing and the bowl surface wherein the seal in automatically engaged as a slip is loaded.

Various other objects, advantages and features of this invention will become apparent to those skilled in the art from the following discussion, taken in conjunction with the accompanying drawings in which:

DESCRIPTION OF THE DRAWINGS

FIG. 9 is a cross-sectional view of another embodiment of the automatic pipe anchor of this invention generally similar to the embodiment shown in FIGS. 1–8 but illustrating casing slips having an outer frustoconical surface with a relatively large smooth lower surface and a relatively small surface with teeth;

FIG. 10 is a cross-sectional view of another embodiment of the pipe anchor in unloaded condition illustrating a casing slip having load bearing upper and lower smooth surface portions on the back face thereof with sharp teeth therebetween and sealing means between the casing and casing head actuated manually to place the sealing means in sealing relation;

FIG. 11 is a cross-sectional view of another embodiment of this invention in an unloaded condition and illustrating a separate seal assembly used for sealing the annular space between the casing head bowl and the casing; and, FIG. 12 is a sectional view of a further embodiment of this invention in which the slips are mounted within a frustoconical opening in a casing hanger which is, in turn, mounted within a casing head.

The following is a discussion and description of preferred specific embodiments of the pipe anchor comprising this invention with the same referenced numerals used to indicate the same or similar parts and/or structure.

DETAILED DESCRIPTION

Figure 1:
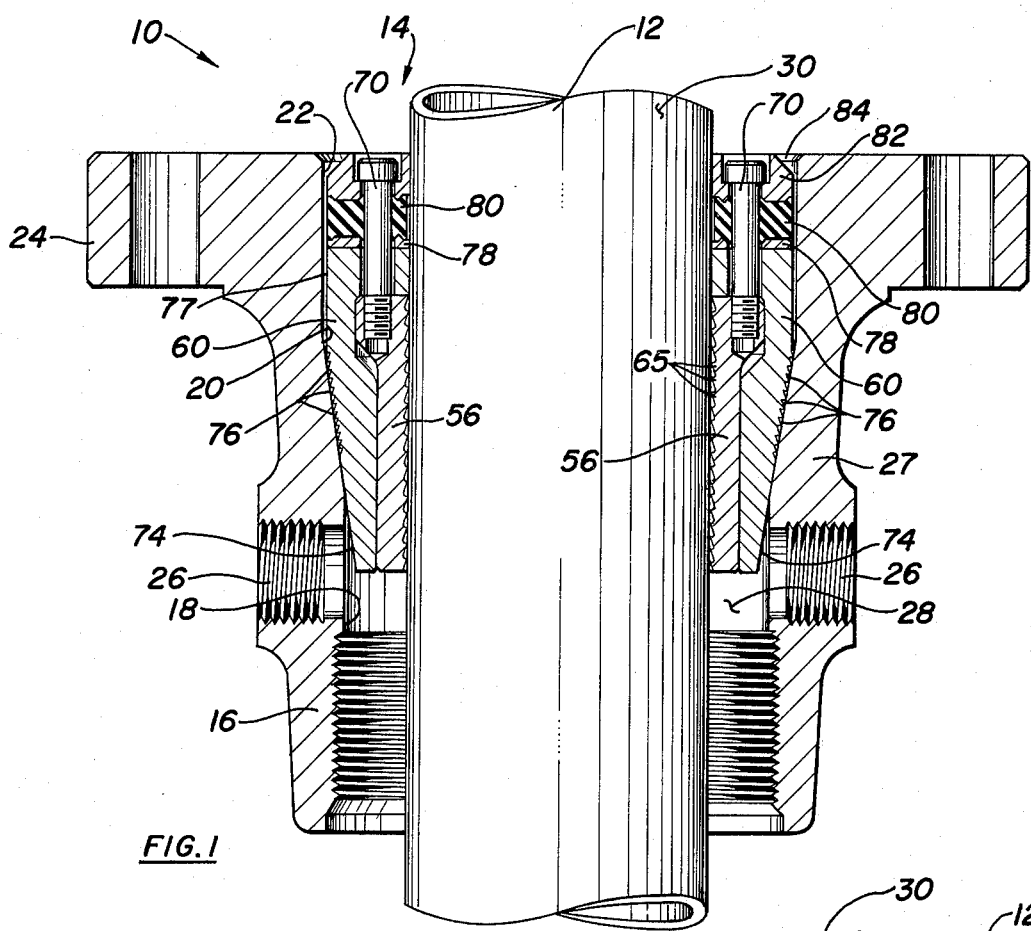
FIG. 1 is a cross-sectional view of a casing head having the automatic pipe anchor comprising one embodiment of this invention mounted therein and supporting a section of casing therein in an unloaded condition.
Figure 5:
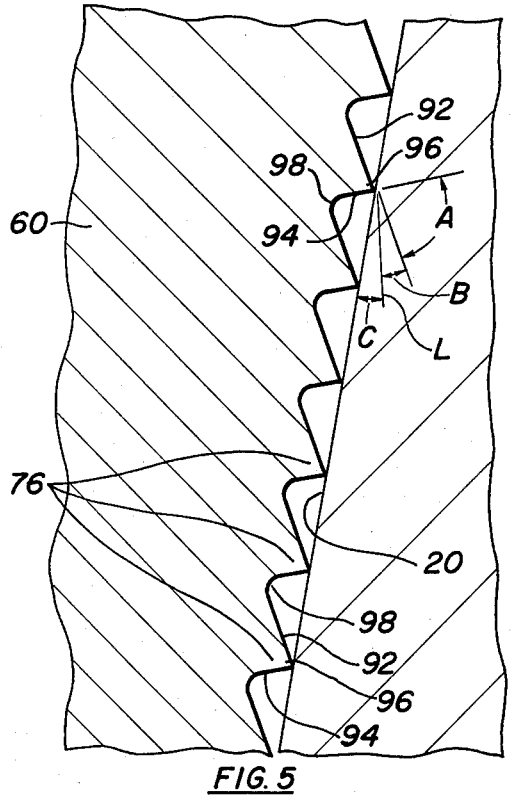
FIG. 5 is an enlarged cross-sectional view of a portion of the teeth on the back face of the pipe anchor shown in contact with a portion of the bowl with crests of the teeth resting on the bowl surface in an unloaded condition.
Figure 6:
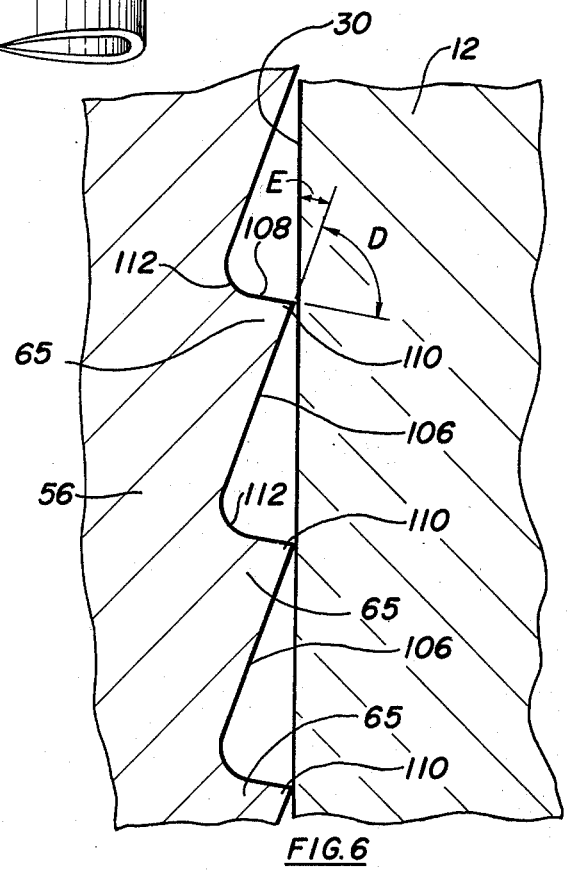
FIG. 6 is an enlarged cross-sectional view of a portion of the teeth on the front face of the pipe anchor in contact with the outer surface of a casing section in an unloaded condition.
Figure 2:
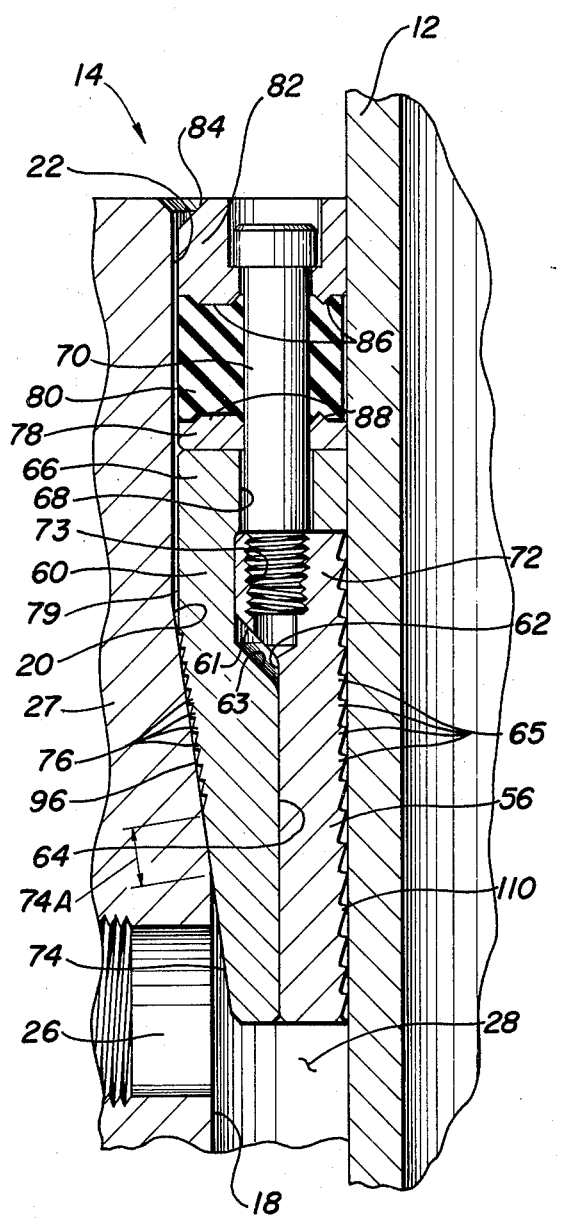
FIG. 2 is an enlarged fragment of FIG. 1 with the casing being shown in section in an unloaded condition.
Figure 3:
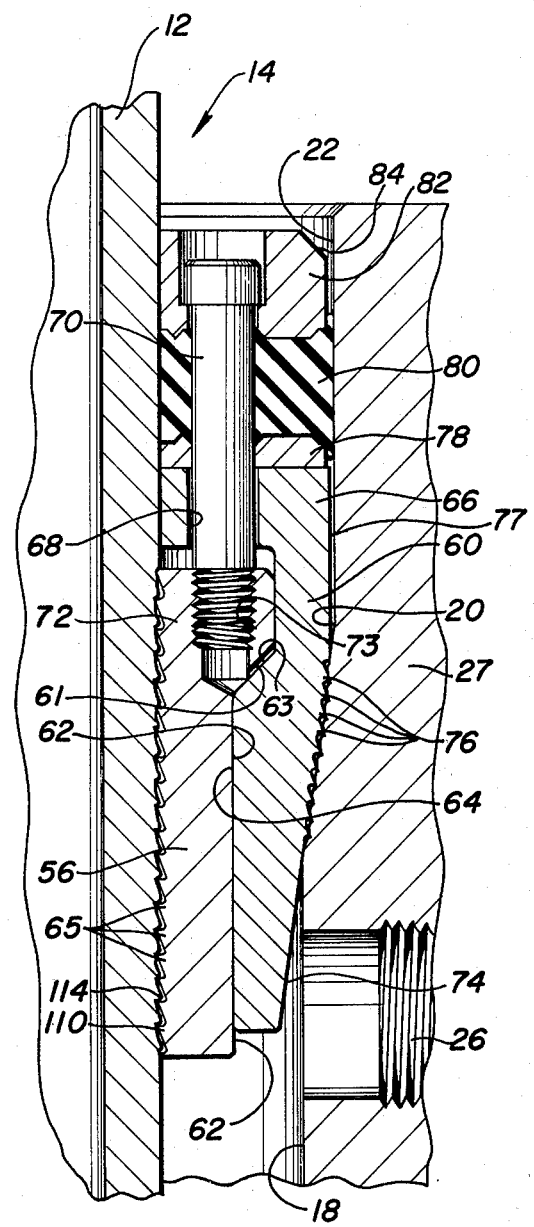
FIG. 3 is an enlarged sectional view similar to FIG. 2 but showing the automatic slip or anchor in a final loaded condition within the casing head.
Figure 7:
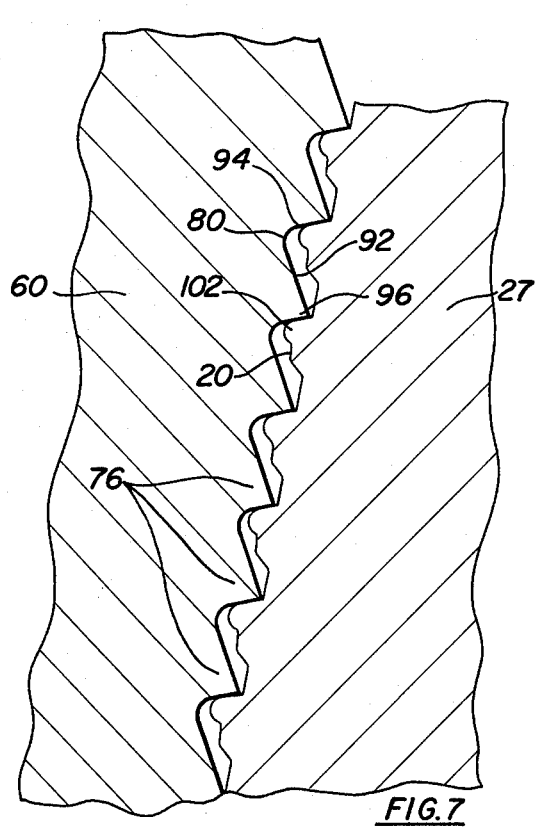
FIG. 7 is an enlarged cross-sectional view similar to FIG. 5 but showing the teeth in a loaded position after biting or gouging into the adjacent bowl surface.
Figure 8:
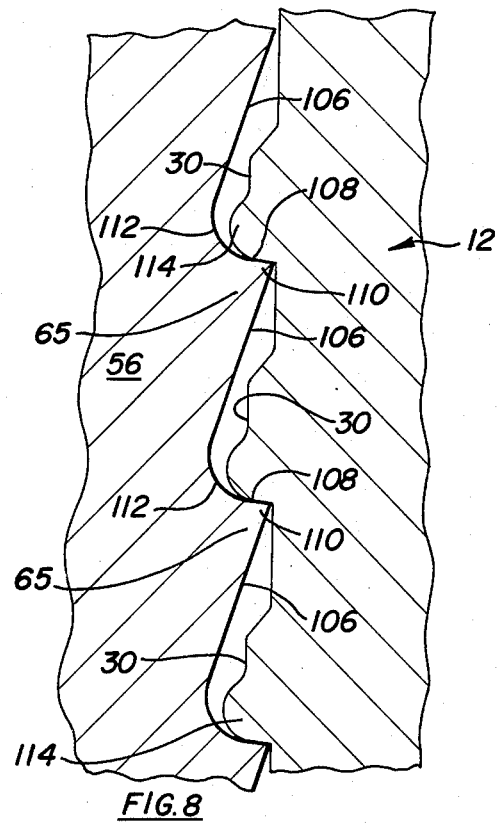
FIG. 8 is an enlarged cross-sectional view similar to FIG. 6 but showing the pipe gripping teeth on the front face of the pipe anchor in a loaded condition after biting into the casing.

Referring first to the embodiment shown in FIG. 1–8, and more particularly to FIG. 1, a casing head is indicated generally at 10 having an upper end portion of a section of casing 12 disposed therein and secured by the pipe anchor or anchoring device of this invention, indicated generally at 14. Anchoring device 14 secures casing 12 in casing head 10 so a string of casing can be suspended from casing head 10. FIGS. 2, 5 and 6 show anchoring device 14 in an unloaded condition. FIGS. 3, 7 and 8 show anchoring device 14 in its final loaded condition.

Casing head 10 is constructed to be mounted on the upper end of a string of surface casing in a well. Casing head 10 has a coupler portion 16 on its normally lower end portion for mounting it on the upper end portion of a string of surface casing. The hollow interior portion of casing head 10 has a lower generally cylindrical surface 18, an essentially frustoconically shaped intermediate bowl surface 20, and an essentially cylindrically shaped upper surface 22 extending upwardly from intermediate bowl surface 20. Upper cylindrical surface 22 is connected with the upper and larger diameter portion of frustoconical surface 20, and lower cylindrical surface 18 is connected with the smaller diameter end of frustoconical surface 20, as shown clearly in FIGS. 1–3. Casing head 10 has an outwardly extending flange 24 at the upper end of portion thereof with a plurality of apertures therethrough for securing it to other wellhead apparatus. The lower portion of casing head 10 has a plurality of apertures 26 provided through its side wall 27 for communication with an annular space 28 formed between the exterior of casing 12 and lower cylindrical surface 18.

Casing head 10 is constructed with frustoconical surface 20 being substantially smooth which can be easily accomplished by good machining practices. Likewise upper cylindrical surface 22 is preferably constructed so that it is substantially smooth. The smoothness of frustoconical surface 20 is an important feature of the anchoring device of this invention because the surface must be of a smoothness such that anchoring device 14 will easily slide along it during the initial loading. Preferably, frustoconical surface 20 is machined so it has a relative roughness of around 125 RMS (roof means square) as defined by the American Standards Association in ASA B46.1 dated 1962 on Surface Texture. A roughness of around 300 RMS will function adequately and under some conditions a roughness as high as 500 RMS might be employed. However, for best results, a roughness of around 125

RMS and under around 300 RMS is recommended. Additionally, frustoconical surface 20 is angularly oriented relative to the vertical on the order of approximately between six and two inches per foot tapering toward the center portion of casing head 10. It is to be understood that this taper can be varied to regulate the radial pressure exerted on casing 12.

The anchoring device shown in FIGS. 1–8 can generally be referred to as an automatic slip because the weight of the casing when the casing engages the teeth on the slip effects anchoring of the casing and engagement of a resilient seal in annular space 28 between casing outer surface 30 and interior casing head surface 22.

Figure 4:
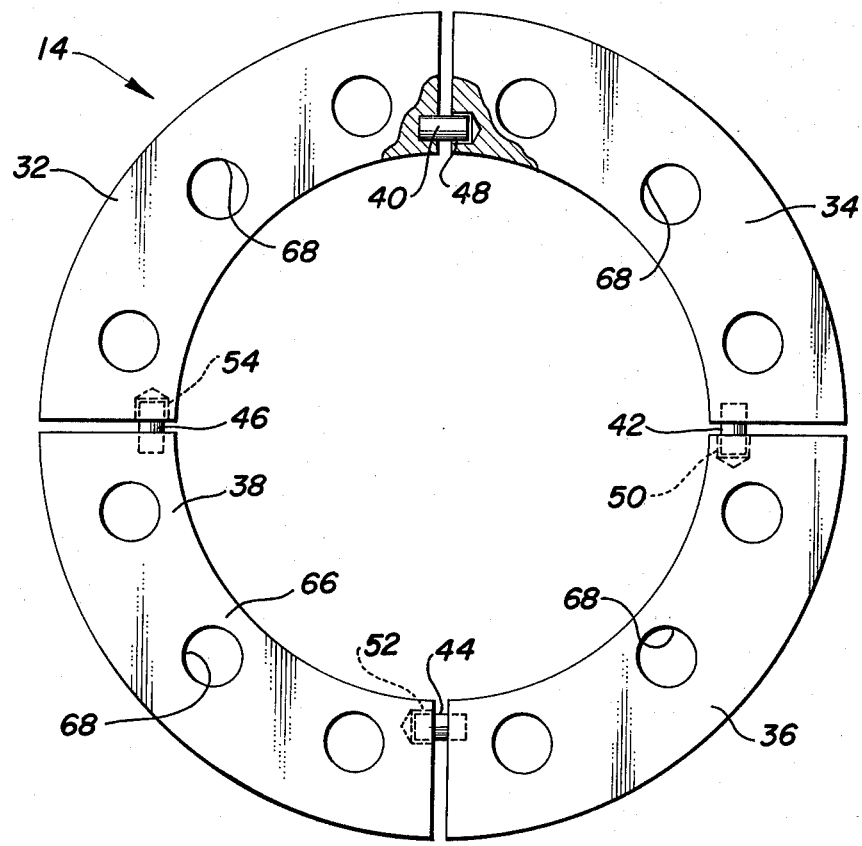
FIG. 4 is a top plan view of the multi-segment portion of the pipe anchor shown in FIGS. 1–3 taken at a point below the seal structure.

FIG. 4 shows a top plan view of the lower portion of anchoring device 14 at a point taken immediately above the portion thereof which grips casing 12 and below the portion thereof which seals casing 12 in casing head 10. As shown, this part of pipe anchoring device 14 is constructed in arcuate segments that are indicated individually at 32, 34, 36, and 38, each segment comprising around a 90° arc. The arcuate segments 32, 34, 36, and 38 may be fitted around casing 12 and connected by a series of pins and apertures which retain them in position relative to one another. Each of the segments 32, 34, 36 and 38 has at least one pin rigidly mounted and extending from one edge and at least one aperture in its opposite edge. For segments 32, 34, 36, and 38, the pins are indicated respectively at 40, 42, 44, and 46 and are received respectively within apertures 48, 50, 52, and 54. It is to be noted that apertures 48, 50, 52, and 54 are sized to allow sliding motion of pins 40, 42, 44, and 46 so the segments can move together and apart uniformly as necessary for assembly about casing in a casing head and loading it in use.

The lower portion of anchoring device 14 in the embodiment of FIGS. 1-8 is constructed with each segment having an inner portion 56 and an outer portion 60 which are in sliding contact with each other on adjacent smooth cylindrical surfaces 62 and 64. Both surfaces 62 and 64 flare generally upwardly and outwardly in their upper end portion as shown clearly in FIG. 2. Surfaces 62 and 64 are cylindrical about the longitudinal axis of casing 12 so relative vertical motion between inner portion 56 and outer portion 60 is in line with the axis of casing 12. When anchoring device 14 is in an unloaded condition respective flared end portions 61 and 63 of surfaces 62 and 64 are in a spaced relation as shown in FIG. 2. When the anchoring device is loaded the flared end portions 61 and 63 move closer together as shown in FIG. 3 to limit relative vertical movement between inner portion 56 and outer portion 60.

Slip segment outer portion 60 is constructed in a generally inverted L-shaped cross-sectional configuration for enclosing inner portion 56 on two sides. A plurality of upwardly extending teeth 65 are formed on the inner portion 56 to engage casing 12 to prevent relative axial movement between casing 12 and teeth 65. Teeth 65 form pipe gripping means.

Outer portion 60 has its upper end portion 66 extending inwardly and over one end of inner portion 56. Upper portion 66 is provided with a plurality of apertures 68 to receive and to pass bolts 70 which are part of the sealing portion of the slip. The upper end portion of slip segment inner portion 56 is indicated at 72. Upper portion 72 is provided with a plurality of threaded apertures 73 vertically aligned with apertures 68. Bolts 70 extend freely through apertures 68 and have threaded ends secured within threaded apertures 73. Upper end portion 72 of inner portion 56 is thicker than its lower portion to fill the space immediately below upper portion 66 of outer portion 60 above the outwardly flared portion of outer portion 60.

The frustoconical back face of anchoring device 14 employs a novel construction which allows sliding motion of outer portion 60 during initial loading and indenting of the adjacent frustoconical supporting surface by indenting means during loading after an initial loading of, for example, 30,000 pounds of casing. The back face of anchoring device 14 has a frustoconically shaped smooth surface portion 74 on its lower portion, a plurality of downwardly extending teeth 76 adjacent the smooth lower portion, and a smooth essentially cylindrically shaped surface 77 extending upwardly from the upper end of teeth 76 which form the indenting means. It is to be noted teeth 76 have their crests lying essentially in the conical plane defined by frustoconical surface 74. In initial loading frustoconical surface 74 slides on the adjacent frustoconical bowl surface 20 in load bearing relation and the downwardly extending teeth 76 do not bite or cut into bowl surface 20. Downwardly extending teeth 76 bite into the smooth frustoconically shaped bowl surface 20 after the normal force between the bowl and the segments of the slip exceed a predetermined and certain value greater than that existing when the pipe gripping means or upwardly extending teeth 65 engage casing 12 sufficiently to prevent relative axial motion between casing 12 and teeth 65, and before this normal force exceeds a value sufficient to prevent relative movement between casing 12 and slip segments 32, 34, 36, and 38. By teeth 76 biting into bowl surface 20 the coefficient of sliding friction between casing head 10 and anchoring device 14 is substantially increased. It is well-known in the art that the normal force exerted on casing 12 must be controlled so that the internal diameter of casing 12 is not reduced beyond practical limits and in any case such that casing 112 is not collapsed.

The portion of anchoring device 14 which seals between casing 12 and casing head 10 is located above segments 32, 34, 36, and 38. This seal has a segmented back up ring 78 placed on top of the segments and below a seal ring 80 formed of a resilient material. A segmented metal compression ring 82 is mounted on top of seal ring 80. Compression ring 82 is provided with a plurality of apertures aligned with apertures 68 to receive bolts 70. Bolts 70 are of the socket type with the heads fitting into enlarged portions of the apertures in ring 82. Compression ring 82 has a beveled upper outer edge surface 84. Resilient seal ring 80 also has a plurality of apertures therethrough in vertical alignment with apertures 68. Prior to installation resilient seal ring 82 is cut angularly so it can be placed around casing 12. In an unloaded condition resilient seal ring 80 is in a spaced relation to cylindrical bowl surface 22 as shown in FIG. 2. Upon loading the pipe anchoring device segment inner portion 56 is moved downwardly which in turn moves the bolts 70 and compression ring 82 downwardly thereby compressing resilient ring 80 between compression ring 82 and back up ring 78. This action radially expands seal ring 80 to fill the annular space between casing 12 and cylindrical bowl surface 22. To assist in retaining resilient ring 80 in position and expanding it radially outwardly both upper compression ring 82 and lower ring 78 are provided with surfaces 86 and 88 respectively extending toward seal ring 80 as shown in FIG. 2. Surfaces 86 and 88 are provided to engage seal ring 80 for expanding ring 80 radially.

FIGS. 5 and 6 show anchoring device teeth 76 and 65 in an enlarged cross section along with a portion of the surface which they contact. FIGS. 5 and 6 show teeth 76 and 65 respectively in the position which they will assume prior to loading of anchoring device 14. The particular construction of the teeth is an important feature of this invention. Both sets of teeth 76 and 65 are preferably formed as buttress type teeth with sharp crests. Furthermore, it is preferred that the buttress teeth have essentially flat upper and lower flanks which intersect at an acute angle.

FIG. 5 shows in enlarged detail teeth 76 on the exterior of anchoring device 14 directed downwardly. Teeth 76 are constructed with angle A between upper flank 92 and lower flank acute angle of around 80°, for example. An angle A somewhere in the range of between about 45° and less than 90° is believed to function effectively. Upper and lower flanks 92 and 94 intersect in a sharp tooth crest 96. Teeth 76 have roots indicated at 98 which are preferably radiused in a smooth contour between the upper and lower flanks. The slip segment outer portion 60 is constructed with crests 96 of teeth 75 lying along a line which is inclined at substantially the same angle as bowl surface 20. The vertical direction and the longitudinal axis of casing 12 is illustrated by line L. The inclination of bowl surface 20 with respect to the vertical and the plane defined by teeth crests 96 is indicated by angle C and may be around 9°, for example. The angle B between the vertical and the direction of orientation of upper flanks 92 may be around 10°, for example. Angle C reflects the amount of taper or inclination in bowl surface 20. Angle A defining tooth crests 96 will obviously affect the size of angle B. The angles of the teeth 76 are chosen so that the teeth will bite into bowl surface 20 and into the material behind the surface in casing head 10 as shown in FIG. 7.

FIG. 7 illustrates teeth 76 in the position they assume when they have bitten into the bowl portion of casing head 10 and penetrated the frustoconical shaped surface of the bowl. It is noted in FIG. 7 that teeth crests 96 are below what was previously smooth surface 20 and material is moved by teeth 76 along lower flanks 94 forming a ridge 102 which extends from surface 20. Because teeth 76 are sharp they bite into the material of casing head 10 in a cutting manner. Preferably teeth 76 are formed on anchoring device 14 by a machining operation wherein they are formed as a helically flighted thread. It is to be noted that teeth 76 can be individually machined as a circular tooth rather than as a thread but in practice it has been found convenient from a manufacturing standpoint to form teeth 76 as threads. Also it is to be noted that teeth 76 can be formed as a plurality of individual protuberances which are pointed if desired. Teeth 76 are preferably formed in the range of between about 4 to 16 teeth per inch of height.

FIGS. 6 and 8 show teeth 65 forming the pipe gripping means in enlarged views along with a portion of casing 12. Teeth 65 are constructed with essentially straight lower flanks 106 and upper flanks 108 which join at sharp crests 110. The roots 112 of teeth 65 formed at the juncture of flanks 106 and 108 are rounded in their cross-sectional appearance as shown. The teeth crests 110 are aligned to lie in a cylindrical plane coaxial with casing 12 so they will simultaneously contact the exterior of casing 12 as shown in FIG. 6. Teeth 65 are directed upwardly and constructed with angle D between lower flank 106 and upper flank 108 preferably being an acute angle of around 80°. An angle D between around 45° and 90° is believed to function effectively. The teeth 65 are constructed with lower flanks 106 of teeth 65 inclined relative to the vertical by an amount indicated at angle E of around 20°, for example. FIG. 6 shows teeth 65 having crests 110 thereof contacting the exterior surface 30 of casing 12 in unloaded condition. FIG. 8 shows teeth 65 in the position which they assume after they have bitten into casing 12. Teeth crests 110 are substantially inwardly of the casing's exterior surface. Because crests 110 are sharp, teeth 65 cut into casing 12 in somewhat of a cutting action forming a recessed portion below surface 30 and raising a portion of the material in a protrusion or ridge positioned along upper flanks 108. Teeth 65 are preferably constructed in the general shape as shown, namely a buttress type thread having essentially flat upper and lower flanks joining in a sharp crest. Teeth 65 can be formed by machining a plurality of grooves in anchoring device 14 or they can be formed as a helically flighted thread. In practice it has been found more convenient to form teeth 65 in the form of a helically flighted thread because of ease in machining. Regardless of whether teeth 65 are cut as threads or not it is important that teeth crests 110 be sharp in order for them to properly bite into casing 12 as described. Teeth 65 are preferably formed in the range of between about 1 to 8 teeth per inch.

As shown in FIG. 2, only smooth portion 74A of lower surface 74 is in load bearing contact with adjacent frustoconical bowl surface 20. Portion 74A prevents the sharp crests 96 from biting into surface 20 under an initial loading condition. It is desirable under most designs that portion 74A be around ¼ inch or more in height in order to provide a sufficient bearing contact area to take the initial loading by the casing without teeth 76 imbedding or digging into the inner surface of the bowl. Under increased loads such as 50 tons or more, for example, the slips may move downwardly or around ¼ inch or more and teeth 76 will continue to imbed into the adjacent bowl surface until the loading has been completed. While a buttress type thread has been illustrated in the embodiment of FIGS. 1–8, other types of threads or protuberances may be employed satisfactorily with the smooth lower surface adjacent the sharp teeth in load bearing contact with the adjacent bowl surface. However since the crests of teeth 76 are sharp the buttress type threads have been found desirable as the sharp crests obtained with buttress type threads do not tend to strip off or shear.

In the use and installation of anchoring device 14, it is mounted in casing head 10 as shown in FIG. 1. Initially in the installation casing 12 is suspended by support apparatus from above (not shown) at a point slightly above its intended final resting position. At this time the several segments of anchoring device 14 are assembled around casing 12 by interlocking pins 42, 44, 46, and 48 in respective apertures 48, 50, 52, and 54, then mounting back up ring 78, resilient ring 80, and compression ring 82, and next securing them to inner portion 56 by bolts 70. Once anchoring device 14 is assembled it is positioned in casing head 10 in the position as shown in FIG. 1. In this position, teeth crests 96 and 110 contact bowl surface 20 and casing surface 30 but do not bite into the respective surfaces. This is the initial or unloaded condition of anchoring device 14. As casing 12 is moved downwardly anchoring device 14 is loaded first in an initial loading condition and later in a final loaded condition. As casing 12 moves downwardly after teeth 65 are engaged inner portion 56 first moves downwardly with casing 12 as teeth 65 bite into casing surface 30. At the same time smooth surface 74A on the back face slides on frustoconically shaped bowl surface 20 and teeth 76 move over surface 20 but do not bite into surface 20. As inner portion 56 moves downwardly it moves bolts 70 downwardly which in turn moves compression ring 82 and seal ring 80 downwardly. When vertically disposed forces on outer portion 60 have increased to an amount to retard the downward motion of outer portion 60, then inner portion 56 can move downwardly an additional amount relative to outer portion 60 to compress resilient ring 80 between rings 78 and 82 expanding it radially between casing head surface 22 and casing surface 30. With an increased loading of anchoring device 14 and downward motion of casing 12 and a radial loading of casing head 10, teeth 76 bite into the adjacent smooth bowl surface 20 when the normal force between casing head bowl and anchoring device 14 exceeds a predetermined and certain value greater than that existing when teeth 65 engage casing 12 sufficiently to prevent longitudinal movement of casing 12 and teeth 65, and before this normal force exceeds a value sufficient to prevent relative movement between casing 12 and anchoring device 14.

As loading on anchoring device 14 is further increased, inner portion 56 moves downwardly relative to outer portion 60 as shown in FIG. 3, and teeth 76 bite into bowl surface 20 as shown in FIGS. 3 and 7. FIG. 3 shows anchoring device 14 in the position which it will assume when the casing 12 has been set or in its ultimate installed condition. In this fianl loaded condition teeth 65 and 76 are engaged into their respective surfaces to an extent as substantially shown in FIGS. 7 and 8, resilient seal ring 80 is compressed against casing 12 and bowl surface 22, and anchoring device inner portion 56 is displaced relative to outer portion 60 substantially as shown in FIG. 3. In this final loaded condition radial forces on casing 12 are sufficient to retain it in a fixed position relative to casing head 10 but the forces are less than that required to collapse, bend or otherwise reduce the diameter of casing 12 beyond an acceptable limit.

When casing 12 is initially suspended by anchoring device 14 in casing head 10 the weight of casing 12 is supported solely by bolts 70. In this position movable inner portion 56 rests with its outwardly flared portion 61 supported on a corresponding portion 63 of outer portion 60 as shown in FIG. 3. The forces brought to bear on resilient member 80 which are used to effect the seal between casing 12 and casing head 10 are transmitted to the compression ring 82 by bolts 70. By utilizing this construction the relative motion between inner portion 56 and outer portion 60 together with the length of bolts 70 is used to regulate compression of resilient ring 80. By regulating the compression of resilient ring 80 in this manner, the ring can be subjected to the proper compressive forces to effect a good seal without damaging the material of the ring. Thus, the full weight of casing 12 is not exerted against resilient ring 80.

Figure 10A:
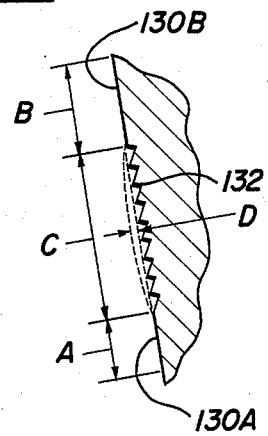
FIG. 10A is a schematic of the embodiment shown in FIG. 10 illustrating the positioning of teeth between load bearing smooth upper and lower surfaces on the back face of the slip.

FIGS. 9, 10, 10A, and 11 illustrate additional embodiments of the pipe anchoring device of this invention. Portions of FIGS. 9, 10, and 11 illustrate the casing head and casing and these portions of the figures bear similar identifying numerals to those elements previously described. FIG. 9 shows anchoring device 14 in the same configuration as shown in FIGS. 1–8 with the exception of teeth 120 forming the indenting means on the exterior of outer portion 60. Teeth 120 differ from teeth 76 in that only a very few of teeth 120 are provided at the upper end portion of frustoconical surface 74. Teeth 120 are structurally similar to teeth 76 as shown in FIG. 5 and as described hereinabove. In the anchoring device shown in FIG. 9 teeth 120 cover a minor portion of the surface area of frustoconical surface 74 whereas in the anchoring device as shown in FIGS. 1–8, teeth 76 cover a substantially larger portion of frustoconical surface 74. Correspondingly, the portion of surface 74 in load bearing contact with bowl surface 20 is increased sufficiently. The number of teeth included in the indenting means can be varied depending upon the particular structural and geometrical shape of the casing head bowl and anchoring device 14 and considering the relative roughness between surfaces 20 and 74. In practice, a minimal number of teeth as shown in FIG. 9 can be used for certain installations while a larger number of teeth as shown in FIGS. 1–8 can be used for other installations.

FIGS. 10 and 10A illustrates another structural embodiment of the anchoring device of this invention indicated generally at 124 and shown with a portion of casing head side wall 27 and a segment of casing 12. Anchoring device 124 includes a plurality of arcuate segments 126 each being a unitary member with integral back and front faces. Segment 126 has a plurality of upwardly extending pipe gripping teeth 128 on its front face. The back face of segment 126 has a frustoconical shaped smooth surface 130 with teeth 132 adjacent the upper portion of smooth surface 130. The portion of the segment's back face above teeth 130 has a cylindrical surface 134. Lower portion 130A of smooth surface 130 is in load bearing contact with adjacent bowl surface 20. To aid in controlling the embedding of teeth 132 in adjacent bowl surface 20, an upper smooth surface 130B is provided above teeth 132 in load bearing contact with adjacent bowl surface 20 and in the same conical plane as surfaces 130 and 130A. Thus, particularly in designs where the load bearing contact surface of the lower smooth surface of the back face is of a small height, it may be desirable to have a smooth frustoconical surface above the teeth on the back face in order to control the imbedment of the teeth in the adjacent smooth bowl surface. Teeth 128, 132, and frustoconical surface 130 are preferably constructed similar to the like elements described in conjunction with the first described embodiment of FIGS. 1–8.

The width of lower portion 130A in load bearing contact with bowl surface 20 is indicated by the distance A and the width of upper portion 130B in load bearing contact with bowl surface 20 is indicated by the distance B. Widths A and B may vary depending, for example, on the loading conditions and materials from which casing 12 and side wall 27 are formed. Width A, for example, may be ½ inch and width B may be ¾ inch. Widths A and B would be a minimum of at least around ¼ inch and a maximum of around 2½ inches. Teeth 132 extend to the conical plane formed by surfaces 130A and 130B and have a total width C between smooth surfaces 130A and 130B. Width C would be a minimum of at least around ¼ inch and a maximum of around three inches. The height of the casing head bowl would affect widths A, B, and C; this height would probably be a maximum of four inches. Widths A, B, and C would be controlled to a great extent by the total loading of the casing and the point at which it is desired for teeth 132 to cut into the adjacent bowl surface. In some instances it may be desirable for the teeth 132 to cut into the adjacent bowl surface when 50% of the total load is reached. In this instance, heights A and B might be relatively large. Segments 126 deflect radially upon loading and this deflection in addition to a crushing of the inner bowl surface from surfaces 130A and 130B cause teeth 132 to cut into the adjacent bowl surface. Upper surface 130B aids in controlling the amount of deflection of segments 126. Deflection D with width C being around two inches may be around 0.005 inch under a 400 ton load of casing. Deflection D would vary depending primarily on the total loading from between 0.001 inch and 0.008 inch for a majority of casing sizes and materials.

A seal assembly is mounted above the arcuate segments of anchoring device 124 and it includes a resilient seal ring 136 positioned between a metal back up ring 138 resting on top of the segments and a compression ring 140 on the upper portion of the anchoring device. A plurality of bolts 142 are positioned around the arcuate segments and extend through aligned openings in the several rings and have their heads thereof resting in recessed portions in the top of compression ring 140. This seal apparatus is the type generally referred to as a manual seal because it must be manually actuated once anchoring device 124 is set and the casing is suspended in its final resting position. Actuating this seal assembly is accomplished by tightening bolts 142 which draw compression ring 140 toward back-up ring 138 to expand resilient ring 136 radially between bowl surface 22 and casing surface 30.

In the use and operation of anchoring device 124, it is operated essentially the same as anchoring device 14 with the exception that the seal must be actuated manually after the casing is suspended. FIG. 10 shows anchoring device in an unloaded position in the casing head bowl with casing 12 therein and the seal assembly in place in a relaxed position. In loading anchoring device 124, teeth 128 initially bite into casing surface 30 as smooth segment surface 130 slides on bowl surface 20 as the normal forces build up and before teeth 132 bite into bowl surface 20. Teeth 132 will bite into bowl surface 20 after the normal force between the bowl and the segmented anchoring device 124 exceeds a certain value greater than that existing when teeth 128 engage the casing sufficiently to prevent relative axial motion of the casing 12 and teeth 128 and before the normal force exceeds the value sufficient to prevent relative movement between casing 12 and pipe anchoring device 124. From this point on teeth 132 bite or cut into bowl surface 20 as described in detail hereinbefore with the embodiment of FIGS. 1–8. When anchoring device 124 reaches the final loading condition, casing 12 is suspended or supported in casing head 10. When this occurs, teeth 132 and 128 are engaged with adjacent respective surfaces similar to the teeth shown in FIGS. 7 and 8, and relative longitudinal motion between casing 12 and casing head 10 is prevented. After segments 126 assume the final loaded position bolts 142 are tightened to cause resilient ring 136 to be expanded between bowl surface 22 and casing surface 30 to provide an effective leakproof seal in the annular space between casing 12 and cylindrical bowl surface 22. When anchoring device 124 is in the final loaded position and bolts 142 have been tightened, the upper portion of compression ring 140 is positioned at or slightly below the upper machined surface of casing head 10 so a flanged member which rests on top of casing head 10 in the wellhead assembly will fit over the upper end portion of anchoring device 124. An advantage in anchoring device 124 is that the seal can be manually adjusted if necessary to tighten resilient ring 136 sufficient for sealing the annular space at the desire of the user. Anchoring device 124 has application in situations where manual tightening of the seal is required or desirable and in other situations where automatic sealing and anchoring devices are for some reason undesirable.

FIG. 11 shows an additional structural embodiment of the anchoring device of this invention indicated generally at 150 positioned between casing head side wall 27 and casing 12. Anchoring device 150 has a plurality of arcuate segments 152 which form an annular support in the bowl of casing head 10. Anchoring device 150 does not have any means to seal the annular space between bowl surface 22 and casing outer surface 30 and a separate sealing means indicated generally at 151 is provided to seal this annular space. Sealing means 151 has an annular member 154 which is in use mounted above and separated from the segments of the anchoring device. Annular seal ring 154 has an annular groove 156 in its inner circumference to receive and mount a resilient O-ring 158 for sealing against casing outer surface 30. Ring 154 has an annular groove 160 in its outer circumference to receive and mount another resilient O-ring 162 for sealing against bowl surface 22. Anchoring device segments 152 are generally wedge shaped in cross section and have the pipe gripping means on the front face thereof comprising a plurality of upwardly extending buttress type teeth 164. The back face of segments 152 have a lower frustoconical shaped smooth surface 166, a plurality of downwardly extending teeth 168 adjacent smooth surface 166, and a generally cylindrically shaped upper surface 170 extending upwardly from teeth 168 to the upper end of the segment. In the upper portion of each segment a groove 172 is provided around the outer peripheral portion. A split retainer ring 174 is positioned in groove 172 and mounted by fasteners 176. Split retainer ring 174 extends around anchoring device 150 to in use position the several segments of the device in a juxtapositional relation to each other for installation purposes. Retainer ring 174 assists in moving the several segments simultaneously together during loading of the anchoring device. Retaining ring 174 is installed as anchoring device is assembled around a casing.

FIG. 11 shows anchoring device 150 in the unloaded condition resting in a casing head bowl with casing 12 positioned therein and with a seal thereabove. It is to be noted that the seal does not have to be installed when the anchoring device is installed as it can be installed after the anchoring device 150 is in the final loaded condition and casing 12 is suspended.

Figure 12:
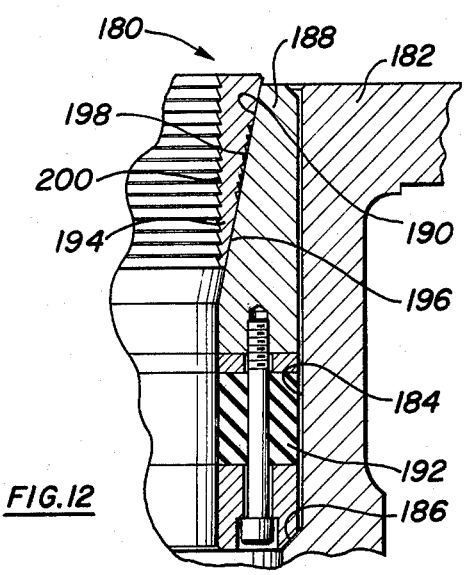

Referring to FIG. 12, a separate embodiment of the invention is illustrated having a casing hanger generally indicated at 180 mounted within a so-called straight bore casing head 182. Casing head 182 forms a bowl with a cylindrical inner surface 184 and a lower inwardly extending annular ledge 186 on which casing hanger 180 is supported. Upper acruate hanger segment 188 of casing hanger 180 has a frustoconical inner smooth surface 190 and upon downward movement thereof radially expands resilient seal 192. A slip segment 194 has a lower smooth surface 196 in load bearing contact with surface 190. Teeth 198 extend from the back face of segment 194 and upon a predetermined load being reached from the weight of the casing engaging teeth 200 on the front face of segment 194, teeth 198 dig into surface 190. Thus, the present invention may be employed with casing heads having a straight bore and function in a manner similar to casing heads having a frustoconical bore therein.

In the manufacture of the pipe anchoring device of this invention the multi-segmented pipe support means and associated ring members can be easily constructed as a circular member and cut or severed into several segments. The anchoring device utilizes frictional contact of smooth surfaces and the biting action of sharp teeth on the back face of the slips to achieve the gripping and wedging action necessary to suspend casing from a well-head assembly. The anchoring device is adapted for use where automatic sealing along with anchoring is required or where only anchoring of a casing is required.

What is claimed is:

1. A pipe anchoring device mountable within a smooth frustoconical supporting surface in a casing head for securing a pipe extending downwardly therethrough in a suspended relation, comprising:
    a. annular segmented wedge shaped pipe support means disposed symmetrically within the casing head in supporting contact with the frustoconical supporting surface, said wedge shaped pipe support means having a generally cylindrical inner periphery and a frustoconical outer periphery,
    b. pipe gripping means on the inner periphery of said annular segmented support means facing toward the pipe,
    c. a lower smooth surface on the frustoconical outer periphery of the wedge shaped pipe support means and indenting means adjacent the lower smooth surface, said lower smooth surface being in load bearing contact with the smooth frustoconical supporting surface and maintaining the indenting means out of imbedment with the adjacent frustoconical supporting surface until a predetermined loading is reached from the weight of the pipe,
    d. said indenting means having portions facing the frustoconical supporting surface and cutting into the frustoconical surface after a predetermined loading is reached which results in a deflection between the indenting means and supporting surface, said indenting means being sharp and facing said smooth frustoconical supporting surface for movement thereon without biting into said supporting surface when said loading is less than that required for said pipe gripping means to engage the pipe sufficiently to prevent relative axial motion between said pipe gripping means and the pipe.

2. The pipe anchoring device of claim 1, wherein:
    a. said pipe gripping means comprises sharp crested teeth integral with said segmented support means and
    b. said indenting means comprises sharp teeth integral with said segmented support means and having crests in a conical plane defined by the outer peripheral surface of said wedge shaped pipe support means.

3. The pipe anchoring device of claim 2, wherein said indenting means teeth are substantially as sharp as said pipe gripping means teeth.

4. The pipe anchoring device of claim 3, wherein said teeth are formed of buttress type threads, the teeth forming said indenting means being directed downwardly and the teeth forming the pipe gripping means being directed upwardly.

5. The pipe anchoring device of claim 4, wherein said teeth have relatively flat upper and lower flanks joining each other at a sharp crest.

6. The pipe anchoring device of claim 5, wherein said indenting means teeth are substantially finer than said pipe gripping means teeth.

7. The pipe anchoring device of claim 6, wherein said teeth are formed as helix threads.

8. The pipe anchoring device of claim 7, wherein the tooth thread defining the teeth on said pipe gripping means is opposite to the tooth thread defining the teeth on said indenting means.

9. The pipe anchoring device of claim 7, wherein the tooth thread defining the teeth on said pipe gripping means is the same as the tooth thread defining the teeth on said pipe indenting means.

10. The pipe anchoring device of claim 1, wherein:
    a. said segmented support means has an inner portion and an outer portion each having smooth generally cylindrical surfaces in contact with each other and disposed coaxially around said pipe, said smooth surfaces each flaring in an outward direction in an end portion thereof inside said segmented support means to form outwardly extending flaring surfaces in vertically spaced relation and out of contact with each other in an unloaded position of the pipe anchoring device, and
    b. said outer portion has a means to support said inner portion therefrom for vertical movement relative to said outer portion and abutting contact between said flaring surfaces upon loading of the pipe anchoring device, and a means to resiliently seal an annular space between the pipe and the casing head.

11. The pipe anchoring device of claim 10, wherein:
    a. said means to resiliently seal said pipe includes a resilient seal ring positioned over the outer portion of each segment of said segment support means between an upper seal retainer member and the subjacent surface of said outer portion, and
    b. said means to mount said inner portion has a connector member rigidly mounted on said inner portion extending through said outer portion and secured to said seal retainer member, said retainer member being movable toward said segment to compress and expand said resilient seal ring between said pipe and said casing head.

12. The pipe anchoring device of claim 1, wherein:
    a. said pipe anchoring device has a means to resiliently seal said pipe having a resilient member over the outer portion of each segment support means positioned between a seal compression member and the subjacent surface of said segment, b. said means to resiliently seal has means with each segment and said seal compression member to compress said resilient member between said pipe and said casing head.

13. The pipe anchoring device of claim 12, wherein:
a. said means to compress has a connector member rigidly mounted in each said segment extending through said resilient member and extending through said compression member, and
b. said connector member being threadedly mounted in each said segment and having an abutment on its outer end portion to contact said compression member so that tightening said connector member compresses said resilient member between said compression member and said segment thereby expanding said resilient member against said casing head and said pipe in sealing relation.

14. The pipe anchoring device of claim 1, wherein:
a. said pipe anchoring device has a separate means to steal said pipe and said casing head including a seal support member mounted in said casing head around said pipe and spaced vertically upwardly from said segmented support means.

15. The pipe anchoring device of claim 14, wherein:
a. said pipe gripping means comprises sharp crested teeth integral with said segmented means, and
b. said indenting means comprises sharp crested teeth integral with said segmented support means and having crests in a conical plane defined by the outer peripheral surface of said wedge shaped pipe support means, and
c. said seal support member is an annular member having grooves around its outer and inner peripheries with said grooves having resilient seal rings mounted therein.

16. The pipe anchoring device of claim 1, wherein:
a. said pipe gripping means has a plurality of teeth spaced from between one tooth per inch to six teeth per inch, and
b. said indenting means has a plurality of teeth spaced from between four teeth per inch to sixteen teeth per inch.

17. The pipe anchoring device of claim 1, wherein said indenting means has a plurality of teeth around the exterior thereof adjacent said lower smooth surface, said teeth spanning a longitudinal distance from between approximately one half inch in length to approximately two inches in length.

18. A pipe anchoring device for securing a pipe extending downwardly therethrough, comprising:
a. an annular support means for the pipe having an opening therethrough defining a generally frustoconical smooth inner surface,
b. an annular wedge means disposed in said support means including a plurality of arcuate segments for fitting around the pipe, each of said segments having a generally cylindrically shaped front face and a plurality of upwardly extending teeth on said front face,
c. each of said segments having a generally frustoconical back face, said back face having spaced annular upper and lower smooth surfaces in load bearing contact with said annular support means frustoconical surface to provide constant contact with said support means and cause inward movement of said wedge means and engagement of said upwardly extending teeth with the pipe,
d. said back face having a plurality of sharp teeth thereon between said upper and lower smooth surfaces to engage said annular support means frustoconical surface under increased loading from the pipe after said upper and lower smooth surfaces have moved downwardly along and deformed said annular support means frustoconical surface, and
e. said back face teeth having crests thereon in substantially the same conical plane defined by said annular smooth surfaces on said back face, said back face teeth engaging and biting into the smooth inner surface of said annular support means after the loading exceeds a predetermined and certain value and upon further downward loading of said wedge means said back face teeth further bite into said annular support means inner surface so that the coefficient of sliding resistance between the wedge means and annular support is increased.

19. The pipe anchoring device of claim 18, wherein said teeth are buttress type teeth, with elongated lower flanks thereof being generally oriented downwardly and shorter upper flanks thereof being generally oriented transverse to said downward direction.

20. The pipe anchoring device of claim 19, wherein said teeth are formed as helix threads.

21. The pipe anchoring device of claim 18, wherein:
a. each of said segments has an inner portion and an outer portion with each having smooth surfaces in contact with each other and disposed coaxially around said pipe, said smooth surfaces flaring in an outward and upward direction in an upper end portion of said annular wedge means, said flaring surfaces normally being spaced from each other and
b. said outer segment portion has means to mount said inner portion in depending relation therefrom and a means to resiliently seal an annular space between said pipe and said annular support means.

22. A pipe anchoring device for securing a pipe extending downwardly therethrough, comprising:
a. an annular support means for the pipe having an opening therethrough defining a generally frustoconical smooth inner surface,
b. an annular wedge means disposed in said support means including a plurality of arcuate segments for fitting around the pipe, each of said segments having a generally cylindrically shaped front face and a plurality of upwardly extending sharp crested teeth on said front face, and each of said segments having a generally frustoconical back face having a smooth surface lower portion thereof to provide a slidable load bearing surface in contact with said annular support means frustoconical surface to provide constant contact with said support means and cause inward movement of said wedge means and engagement of said upwardly extending teeth with the pipe,
c. each of said segments having a plurality of downwardly extending sharp crested teeth upwardly adjacent the smooth surface lower portion of said frustoconical surface to engage said annular support means frustoconical surface under increased loading from the pipe after said segments smooth surface portion has moved downwardly along and deformed said annular support means frustoconical surface.

d. said upwardly extending teeth and said downwardly extending teeth being buttress type helix threads having upper and lower flanks joining in crests, e. said downwardly extending teeth are substantially as sharp as said upwardly extending teeth and the crests thereon are in the same conical plane defined by said frustoconical smooth surface lower portion, said downwardly extending teeth engaging and biting into said inner surface of said annular support means after the loading exceeds a predetermined and certain value, and upon further downward loading of said wedge means said downwardly extending teeth further bite into said annular support means inner surface so that the coefficient of sliding resistance between the wedge means and annular support is increased.

23. A pipe anchoring device mountable within a smooth frustoconical supporting surface in a casing head for securing a pipe extending downwardly therethrough, comprising:

a. annular wedge shaped pipe support means disposed symmetrically within the casing head in supporting contact with the frustoconical supporting surface and including a plurality of arcuate segments for fitting about the pipe, said wedge shaped pipe support means having a generally cylindrical inner periphery and a frustoconical outer periphery, b. pipe gripping means on the inner periphery of said annular segmented support means facing toward the pipe, c. spaced upper and lower smooth surfaces on the frustoconical outer periphery of the wedge shaped pipe support means and indenting means positioned between the spaced smooth surfaces, said smooth surfaces being in load bearing contact with the smooth frustoconical supporting surface and maintaining the indenting means out of imbedment with the adjacent frustoconical supporting surface until a predetermined loading is reached, d. said indenting means having portions facing the smooth supporting surface to bite into and hang on said supporting surface after a predetermined loading is reached which results in a deflection between the indenting means and supporting surface, said smooth surfaces maintaining said indenting means out of imbedment into the supporting surface until said predetermined loading is reached, e. each arcuate segment having an inner portion and an outer portion each having smooth cylindrical surfaces in contact with each other and disposed coaxially around said pipe, said smooth surfaces on said inner and outer portions flaring outwardly adjacent the upper end portions thereof to form outwardly extending flaring surfaces in vertically spaced relation to each other in unloaded condition, f. said outer portion including means to seal between said pipe and said casing head having a resilient member over the outer portion of said segments positioned between a seal retainer member and subjacent surface of said segments, and g. said outer portion has a means to mount said portion in depending relation including a connector member rigidly mounted on said inner portion extending through said outer portion to permit vertical movement of said inner portion relative to said outer portion and abutting contact between said flaring surfaces upon loading of the pipe anchoring device, said connector member being secured to said seal retainer member to move said seal retainer member toward said segments to compress said resilient member and forcing it to expand to contact said pipe and said casing head in sealing relation.

24. The pipe anchoring device of claim 23, wherein a casing hanger is mounted within the casing head and has said smooth frustoconical supporting surface thereon, said casing head having a generally cylindrical bore therein.

25. The pipe anchoring device of claim 23, wherein the casing head has a generally frustoconical bore therein to define said smooth frustoconical supporting surface.

* * * * *